June 21, 1949.    G. E. MURPHY    2,474,062
CLAMPING RING
Filed Jan. 21, 1946
Fig. 1.
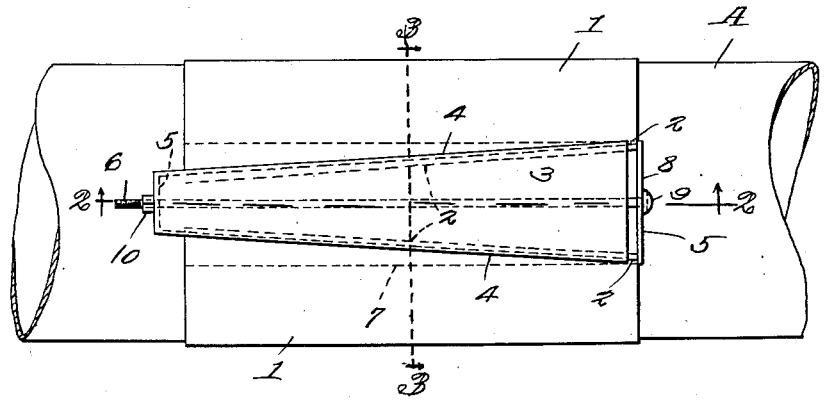
Fig. 2.
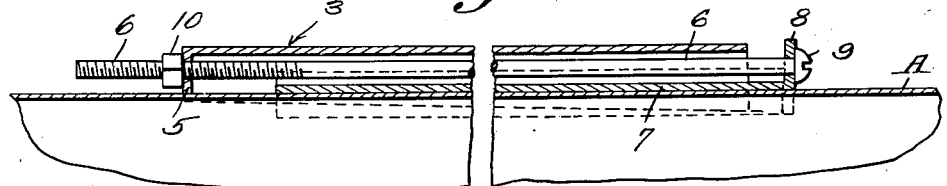
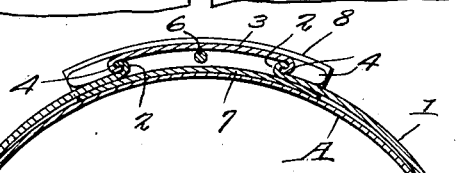
Fig. 3.
Fig. 4.
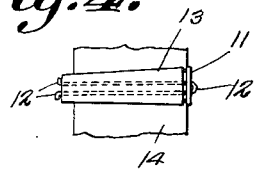
G. E. Murphy
INVENTOR.
BY
ATTORNEYS.

Patented June 21, 1949

2,474,062

UNITED STATES PATENT OFFICE 2,474,062

CLAMPING RING

Gerald E. Murphy, Portsmouth, Ohio

Application January 21, 1946, Serial No. 642,583

1 Claim. (Cl. 138—99)

This invention relates to a clamping ring primarily designed for use in repairing round objects such as water pipes, hose, etc. and for joining tubular structures.

An object of the invention is to provide a clamp which can be applied readily to the parts to be repaired or connected and, when so applied will remain securely in place against accidental removal.

A further object is to provide a clamp which will adapt itself to different diameters of objects.

With the foregoing and other objects in view which will appear as the description proceeds, the invention consists of certain novel details of construction and combinations of parts hereinafter more fully described and pointed out in the claims, it being understood that changes may be made in the construction and arrangement of parts without departing from the spirit of the invention as claimed.

In the accompanying drawing the preferred form of the invention has been shown.

In said drawing

Figure 1 is a plan view of the clamp mounted on a tubular member.

Figure 2 is an enlarged section on line 2—2 Figure 1.

Figure 3 is an enlarged section on line 3—3 Figure 1.

Figure 4 is a plan view of a modified structure, a portion being broken away.

The clamp constituting the present invention comprises a band 1 formed of sheet metal or any other suitable material of such size as to extend around the greater portion of the tubes or other objects A to be repaired or joined. The free longitudinal edges of this band are spaced apart but are extended along diverging lines and are outturned as indicated at 2.

Bridging the gap between the outturned edges 2 is a key 3 wedge-shaped and having opposed inturned flanges 4 converging toward one end. One end of the key which is formed preferably of a sheet of metal or the like, has a crosshead or flange 5 adapted to be adjustably engaged by a tie device 6 which can be in the form of a screw-threaded bolt, a bendable wire, or the like. A bridging plate 7 is extended across the gap between the edges 2 and is located inside the band 1 and in contact with the object or objects A as clearly indicated at Figure 3. This band has a head or flange 8 at one end bearing against the edge of the band 1 as shown in Figure 1 and is adapted to receive one end portion of the tie device 6 which, if a bolt, can have a head 9 for engaging the head or flange 8.

In practice the band 1 is placed about the object or objects to be repaired or joined and the inner bridging plate 7 is inserted between said object or objects A and the two edge portions of the band as shown in Figure 3. When in this position the head or flange 8 of this bridging plate will bear against one edge of the band 1 as shown in Figure 1. The bridging key 3 which is wedge-shaped, is placed with its large end astride the edges 2 where they are closest together and is then thrust longitudinally so as to draw said edges 2 toward each other with the flanges 4 interfitting with the edges or flanges 2. The tie device 6 is inserted into the heads 5 and 8 and tightened by means of a nut 10 or otherwise. With the parts thus assembled the band will be drawn tightly about the object or objects A and as the key is held against retrograde movement by the tie device 6 there is no danger of the parts becoming disconnected after they have been tightened.

It is to be understood that if desired the bridging plate 7 can be dispensed with. In that event a crosspiece or head 11 could be placed against one edge of the band so as to bridge the wide end of the gap between the longitudinal edges of the band, as shown in Figure 4. Thus when the key is placed in engagement with the outwardly extending flanges of the band and is tied to the head 11 by a tie device, the key will be held against movement away from the head 11 and by adjusting the tie device, the key can be moved toward said head 11 so as to contract the band.

Instead of using a bolt as shown in Figures 1, 2 and 3 an elongated cotter pin 12 can be employed for effecting a locking connection between the key 13 and the adjustable band 14.

What is claimed is:

A clamp for pipes or the like, comprising a band proportioned to partially encircle the same, the band having spaced apart and converging longitudinal edges, a flange extending from end to end of each of said edges, a wedge-like key mountable on the band for movement longitudinally thereof, there being longitudinal flanges on the sides of the key adapted for slidable interfitting engagement with the flanges of the band, a plate insertable between the band and the object to which the band is applied, said plate being adapted to bridge the space between, and lap, the longitudinal edges of the band, a cross head on one end of the plate abutting against one end of the band, a cross head on one end of the key opposing said first-named cross head, and a tie device connecting the cross heads and extended longitudinally of the band and key, said tie device being adapted to shift the key longitudinally of the band, whereby to draw the longitudinal edges of the band toward each other, and to lock the key in the position to which shifted.

GERALD E. MURPHY.

REFERENCES CITED

The following references are of record in the file of this patent:

UNITED STATES PATENTS

| Number | Name | Date |
|---|---|---|
| 224,397 | Crook | Feb. 10, 1880 |
| 946,207 | Doak | Jan. 11, 1910 |
| 969,919 | Stulp | Sept. 3, 1910 |
| 1,463,794 | Pollak | July 31, 1923 |
| 2,245,037 | Hersey | June 10, 1941 |